(12) United States Patent
Chou et al.

(10) Patent No.: US 7,632,139 B2
(45) Date of Patent: Dec. 15, 2009

(54) CONNECTOR HAVING USB AND ESATA INTERFACES

(75) Inventors: Sun-Chung Chou, Taipei (TW); Nien-Yu Liao, Taipei (TW)

(73) Assignee: Acer Inc., Taipei (TW)

( * ) Notice: Subject to any disclaimer, the term of this patent is extended or adjusted under 35 U.S.C. 154(b) by 100 days.

(21) Appl. No.: 11/945,845

(22) Filed: Nov. 27, 2007

(65) Prior Publication Data

US 2009/0042411 A1 Feb. 12, 2009

(30) Foreign Application Priority Data

Aug. 10, 2007 (TW) .............................. 96129663 A (51) Int. Cl.
H01R 13/60 (2006.01)
(52) U.S. Cl. ..................................... 439/541.5; 439/638
(58) Field of Classification Search .................. 439/65, 439/638, 541.5, 140; 361/683
See application file for complete search history.

(56) References Cited

U.S. PATENT DOCUMENTS

| | | | | |
|---|---|---|---|---|
| 7,086,879 B2 * | 8/2006 | Higham et al. | ............... | 439/140 |
| 7,189,119 B2 * | 3/2007 | Blichasz et al. | ............. | 439/638 |
| 7,364,463 B1 * | 4/2008 | Ju | ............... | 439/607 |
| 7,411,783 B2 * | 8/2008 | Su | ........ | 361/679.55 |
| 7,487,372 B2 * | 2/2009 | Botchek | ..................... | 713/300 |
| 2006/0046524 A1 * | 3/2006 | Chen | ........................ | 439/65 |
| 2007/0197056 A1 * | 8/2007 | Huang et al. | ................... | 439/74 |
| 2007/0214299 A1 * | 9/2007 | Lo | ............................. | 710/301 |

* cited by examiner

Primary Examiner—Michael C Zarroli (57) ABSTRACT

A connector having USB and eSATA interfaces is used in an electronic device for connecting with an external storage device. The electronic device includes a SATA socket on a circuit board thereof. The connector includes one or more USB ports and an eSATA port. The eSATA port is stacked with the USB ports and includes a first connecting terminal and a second connecting terminal. The first connecting terminal is electrically connected to the external storage device. The second connecting terminal is electrically connected to the SATA socket through a transmission line, so that high-speed data transmission between the external storage device and the circuit board of the electronic device is rendered.

11 Claims, 7 Drawing Sheets

CONNECTOR HAVING USB AND ESATA INTERFACES

FIELD OF THE INVENTION

The present invention relates to a connector, and more particularly to a connector having USB and eSATA interfaces.

BACKGROUND OF THE INVENTION

With increasing development of the computer systems, communication products or network products, the data transmitting speeds of the transmission interfaces of the electronic cards, portable storage devices or external optical disc drives are correspondingly increased. Generally, a serial bus interface such as a USB interface or an IEEE1394 interface was designed to allow peripheral devices to be connected with the computer systems, communication products or network products. Take the USB interface for example. By allowing peripheral devices to be connected and disconnected without rebooting the computer (hot swapping), the USB interface may improve plug-and-play capabilities. Since the USB 2.0 specification is the most popular, the USB 2.0 interface is widely used for connecting the peripheral devices with the computer system.

As the demands on the data transmission amount and the data transmission speed increasingly grow, the transmission speed of up to 480 Mbps for the USB 2.0 interface is insufficient. On the other hand, Serial ATA (SATA) is a computer bus primarily designed for transfer of data between a computer and storage devices such as hard disks or optical drives. Recently, an interface conforming to a high-speed SATA specification, i.e. an eSATA interface, offers performance as high as 3.0 Gbps. In comparison with the USB or IEEE1394 interface, the data transmission speed is much larger and the resource loading is much lower. Since the data transmission speed is increased, the eSATA connector may be applied to external storage devices requiring high data transmission amount.

Conventionally, the eSATA connector is mounted on a peripheral component interconnect (PCI) card, which is inserted into a PCI slot on a motherboard of the computer system. Via the eSATA connector, an external high-capacity storage device will be communicated with the computer system. Since one PCI slot is occupied by the PCI card, the utilization of expanding the peripheral devices is reduced and limited.

Figure 1A:
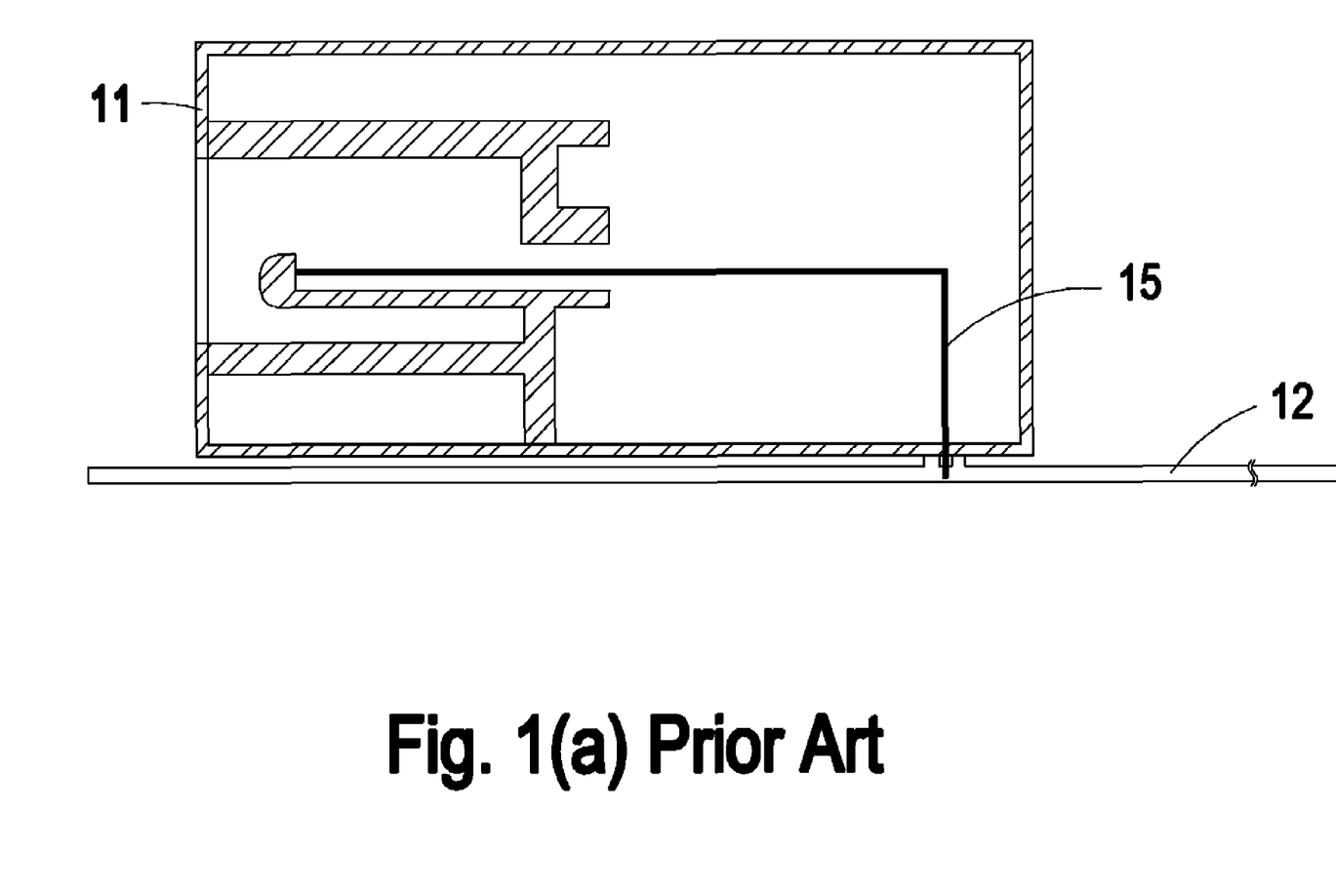
FIG. 1(a) is a schematic cross-sectional view illustrating a conventional eSATA connector mounted on a circuit board.

Another approach of connecting the eSATA connector doesn't need the PCI slot. Please refer to FIG. 1(a). The motherboard 12 has a built-in control chip (not shown) and metallic traces (not shown) mounted thereon. The control chip may control eSATA transmission. The metallic traces are connected to the control chip. The eSATA connector 11 has pins 15. After the pins 15 are mounted on corresponding solder pads of the motherboard 12, the eSATA connector 11 is electrically connected to the control chip of the motherboard 12 through the metallic traces. Generally, the eSATA connector 11 is distant from the control chip. For avoiding electro-magnetic interference (EMI) on the electronic components in the vicinity of the metallic traces, the pins 15 of the eSATA connector 11 is usually short. In addition, the distances between the pins 15 and the solder pads (not shown) should be short. Under this circumstance, the layout fashions of configuring the eSATA connector 11 on the motherboard 12 of the computer system are restricted.

Figure 1B:
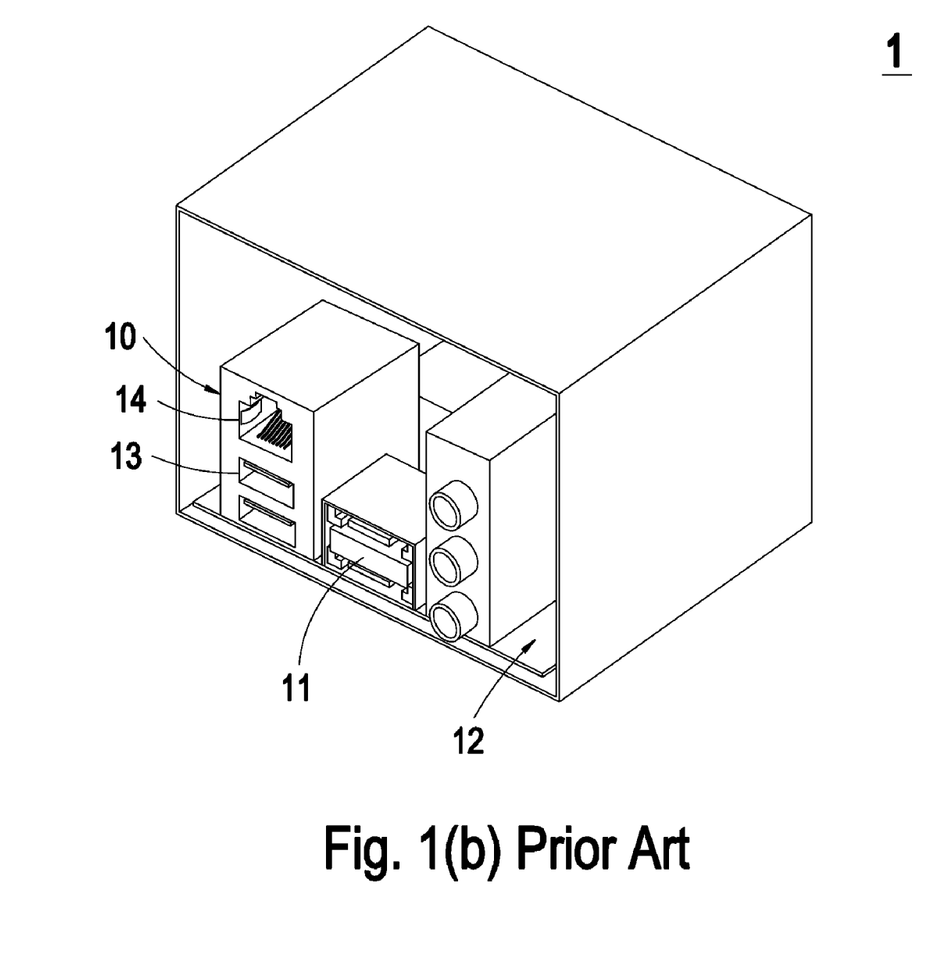
FIG. 1(b) is a schematic backside view of a computer system having an eSATA connector according to the prior art.

Referring to FIG. 1(b), a schematic backside view of a computer system having an eSATA connector is illustrated. In the host computer 1 of FIG. 1(b), the eSATA connector 11 and a connector set 10 are arranged side by side on the motherboard 12. For diversification, the connector set 10 includes one or more USB ports 13 and a local area network (LAN) port 14 or an IEEE1394 connecting port. As previously described, the eSATA connector 11 needs to be disposed close to the motherboard 12 for avoiding electro-magnetic interference (EMI). Under this circumstance, since the eSATA connector 11 fails to be integrated into the connector set 10, the eSATA connector 11 occupies much layout space of the motherboard 12, which is detrimental to the minimization of the host computer 1 and is not cost-effective.

In views of the above-described disadvantages resulted from the conventional method, the applicant keeps on carving unflaggingly to develop a connector having USB and eSATA interfaces through wholehearted experience and research.

SUMMARY OF THE INVENTION

It is an object of the present invention to provide a connector having USB and eSATA interfaces for expanding the functions of connecting with peripheral devices without the need of inserting the connector into the PCI slot.

Another object of the present invention provides a connector having USB and eSATA interfaces in order to enhance space utilization of the motherboard of the computer system.

In accordance with an aspect of the present invention, there is provided a connector having USB and eSATA interfaces used in an electronic device for connecting with an external storage device. The electronic device includes a SATA socket on a circuit board thereof. The connector includes at least one USB port and an eSATA port. The eSATA port is stacked with the USB port and includes a first connecting terminal and a second connecting terminal. The first connecting terminal is electrically connected to the external storage device. The second connecting terminal is electrically connected to the SATA socket through a transmission line, so that high-speed data transmission between the external storage device and the circuit board of the electronic device is rendered.

In an embodiment, the first connecting terminal of the eSATA port is an eSATA socket exposed to outside of the electronic device, and the second connecting terminal of the eSATA port is a connecting structure within the electronic device.

In an embodiment, the external storage device is an external hard disc drive or an external optical disc drive.

In an embodiment, the electronic device is a host computer, and the circuit board is a motherboard of the host computer.

In an embodiment, the first connecting terminal and the second connecting terminal are arranged on opposite sides of the eSATA port.

In an embodiment, a first end of the transmission line is welded onto the second connecting terminal of the eSATA port.

In an embodiment, a second end of the transmission line has a SATA connector to be plugged into the SATA socket.

In an embodiment, the second connecting terminal of the eSATA port is an eSATA socket, and a first end of the transmission line has a SATA connector to be plugged into the second connecting terminal.

In accordance with another aspect of the present invention, there is provided an electronic device. The electronic device includes a circuit board and at least one connector. The circuit board has a SATA socket mounted thereon. The connector is used for connecting with an external storage device. The connector includes at least one USB port and an eSATA port stacked with the USB port. The eSATA port includes a first connecting terminal electrically connected to the external storage device. A second connecting terminal electrically connected to the SATA socket through a transmission line, so that high-speed data transmission between the external storage device and the circuit board of the electronic device is rendered.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
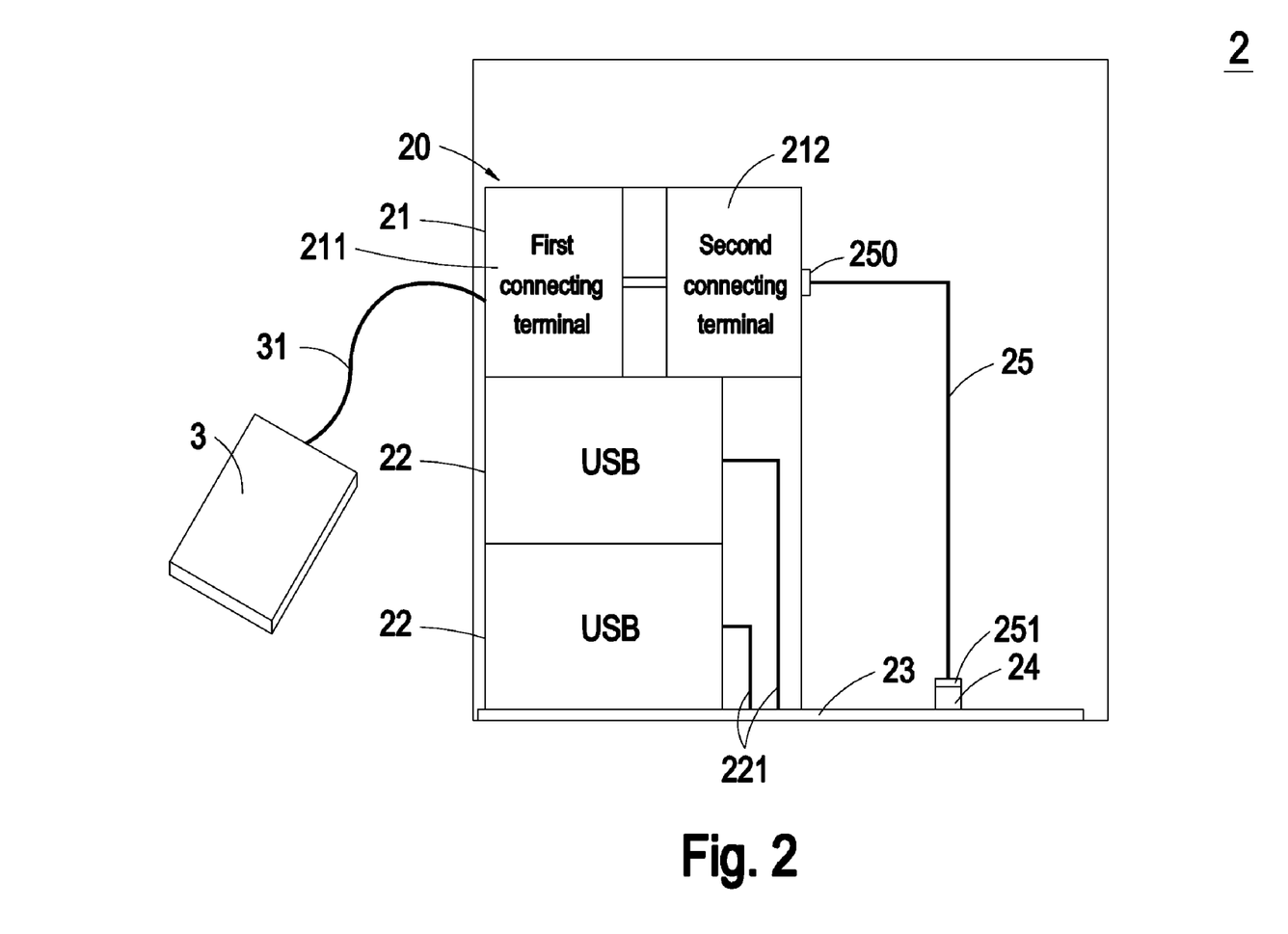
FIG. 2 is a schematic diagram illustrating an electronic device including a connector having USB and eSATA interfaces according to a first preferred embodiment of the present invention.

FIG. 2 is a schematic diagram illustrating an electronic device including a connector having USB and eSATA interfaces according to a first preferred embodiment of the present invention. In this embodiment, the electronic device 2 is a host computer. On the motherboard 23 of the host computer 2, a connector 20 and a SATA socket 24 are provided. The connector 20 has one eSATA port 21 and one or more (e.g. two) USB ports 22. The eSATA port 21 and the two USB ports 22 are vertically arranged in a stacking form. The numbers of the eSATA port 21 and the USB ports 22 may be varied as required.

Please refer to FIG. 2 again. The eSATA port 21 includes a first connecting terminal 211 and a second connecting terminal 212. The first connecting terminal 211 and the second connecting terminal 212 are communicated with each other and disposed on opposite sides of the eSATA port 21. As shown in FIG. 2, the first connecting terminal 211 is exposed to outside of the host computer 2 to be electrically connected to an external storage device 3, for example an external hard disc drive, an external optical disc drive or the like, through a transmission line 31. The second connecting terminal 212 of the eSATA port 21 is disposed within the host computer 2. In this embodiment, the second connecting terminal 212 is but not limited to an eSATA socket, and is coupled with a first end of a transmission line 25, wherein the first end of the transmission line 25 is a SATA connector 250 correspondingly to be plugged into the second connecting terminal 212, and a second end of the transmission line 25 is another SATA connector 251. By plugging the SATA connector 251 into the SATA socket 24 on the motherboard 23, the second connecting terminal 212 of the eSATA port 21 may be electrically connected to the motherboard 23 through a transmission line 25, the SATA connector 250 and 251 and the SATA socket 24. Meanwhile, signals may be transmitted to the built-in control chip (not shown) of controlling eSATA transmission in order to be further processed.

The USB ports 22 have pins 221 mounted on the motherboard 23. The USB ports 22 are communicated with associated circuitry or electronic components on the motherboard 23 through metallic traces (not shown) on the motherboard 23, thereby implementing USB-format data transmission.

Figure 3A:
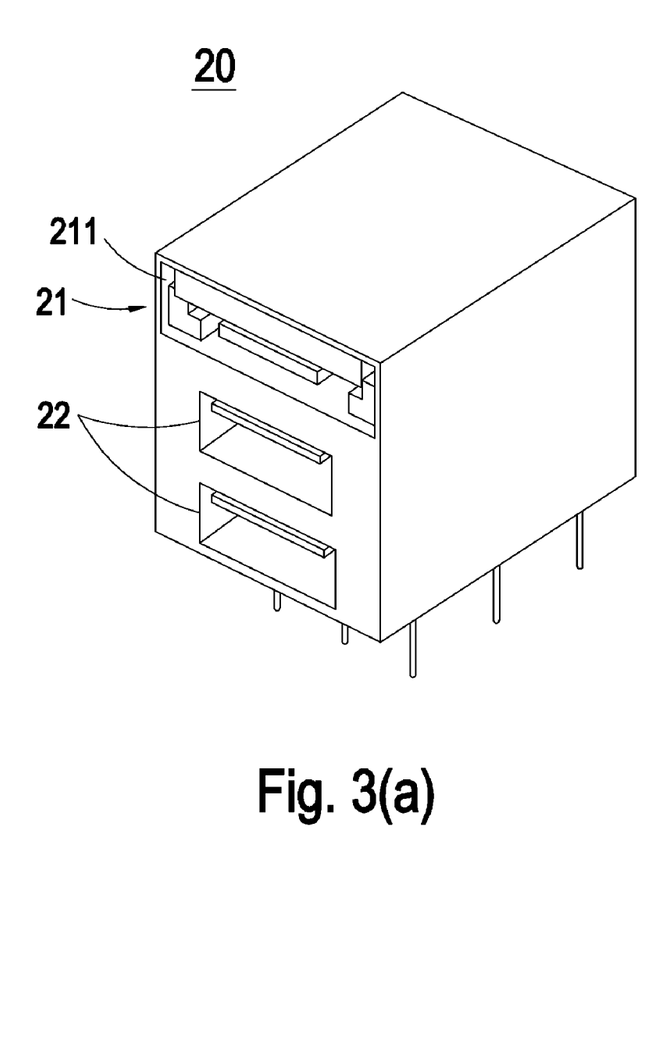
FIG. 3(a) is a schematic perspective view illustrating the connector having USB and eSATA interfaces of the present invention.

FIG. 3(a) is a schematic perspective view illustrating the connector having USB and eSATA interfaces of the present invention. The eSATA port 21 is vertically stacked on the two USB ports 22. In comparison with the connector set 10 shown in FIG. 1(b), the LAN port 14 is replaced by the eSATA port 21. As a consequence, the layout space of the motherboard 12 and the fabricating cost will be saved and the utilization of the expanding the peripheral devices will be enhanced.

Figure 3B:
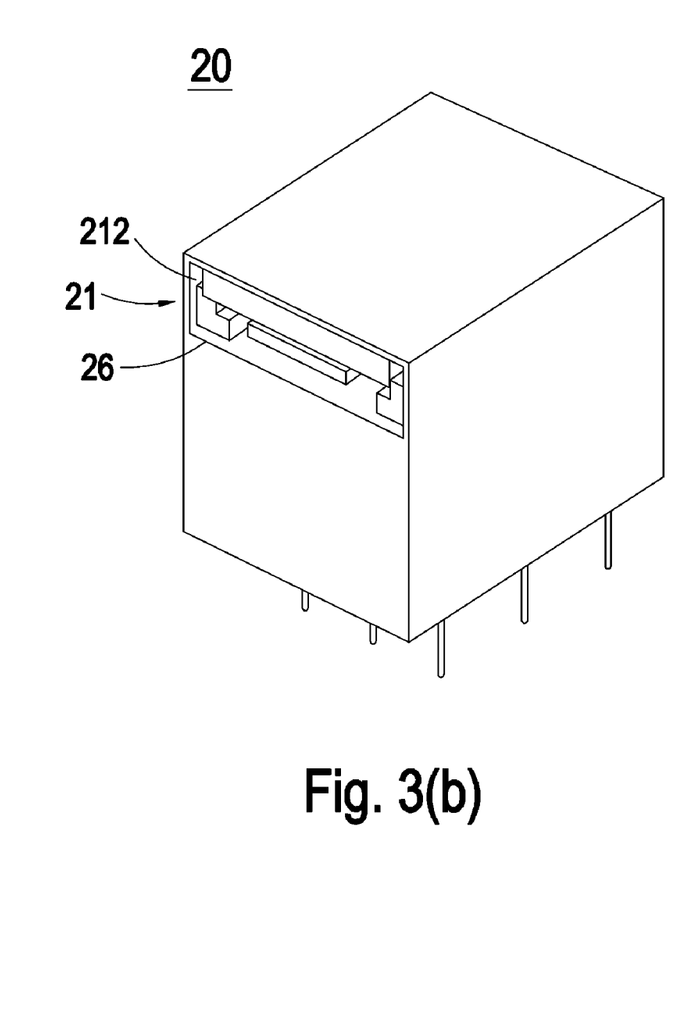
FIG. 3(b) is a schematic backside view of the connector in FIG. 3(a)

Referring to FIG. 3(b), a schematic backside view of the connector 20 is illustrated. In this embodiment, the first connecting terminal 211 of the eSATA port 21 is an eSATA socket. The second connecting terminal 212 of the eSATA port 21 is also an eSATA socket and has an entrance 26 in the backside of the connector 20. By plugging the SATA connector 251 into the SATA socket 24 on the motherboard 23, signals will be transmitted to the motherboard 23 through the transmission line 25 for being further processed.

Figure 3C:
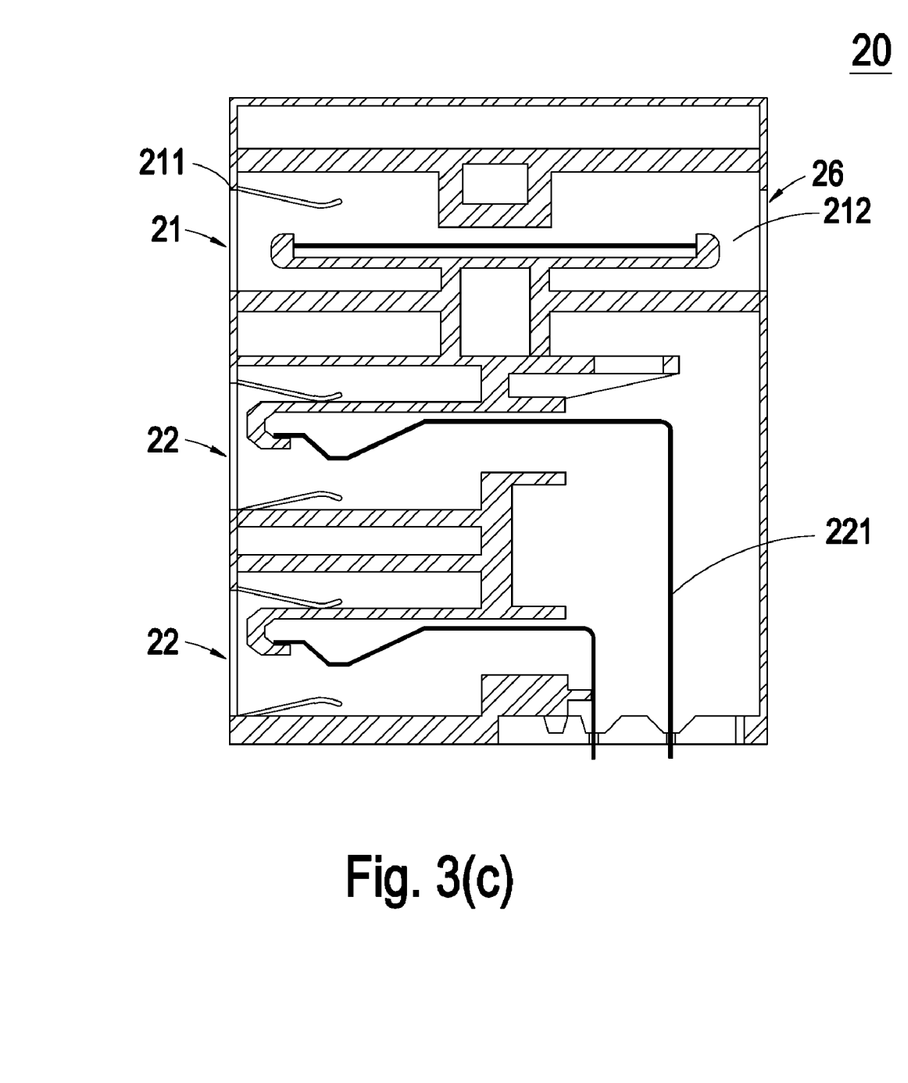
FIG. 3(c) is a schematic cross-sectional view of the connector in FIG. 3(a)

Referring to FIG. 3(c), a schematic cross-sectional view of the connector 20 in FIG. 3(a) is illustrated. The first connecting terminal 211 and the second connecting terminal 212 of the eSATA port 21 are electrically connected with each other and have substantially the same structures. The first connecting terminal 211 is electrically connected to the external storage device 3 (as shown in FIG. 2), and the second connecting terminal 212 is electrically connected to the motherboard 23 through the transmission line 25, the SATA connector 251 and the SATA socket 24. As a consequence, high-speed data transmission between the external storage device 3 and the motherboard 23 is rendered.

As shown in FIG. 3(c), the pins 221 of the USB ports 22 are inserted in the insertion holes of the motherboard 23. The USB ports 22 are communicated with associated circuitry or electronic components on the motherboard 23 through the pins 221 and the metallic traces (not shown) on the motherboard 23, thereby implementing USB-format data transmission.

In the first preferred embodiment of the present invention as described above, since the second connecting terminal 212 is electrically connected to the motherboard 23 through the transmission line 25, the SATA connector 251 and the SATA socket 24, the transmission path to the control chip is reduced. In addition, the connector of the present invention may meet the requirement of SATA EMI specification. Since no PCI slot or IO port of the motherboard 23 is occupied by the connector 20 of the present invention, the space utilization of the motherboard of the host computer is enhanced.

Figure 4A:
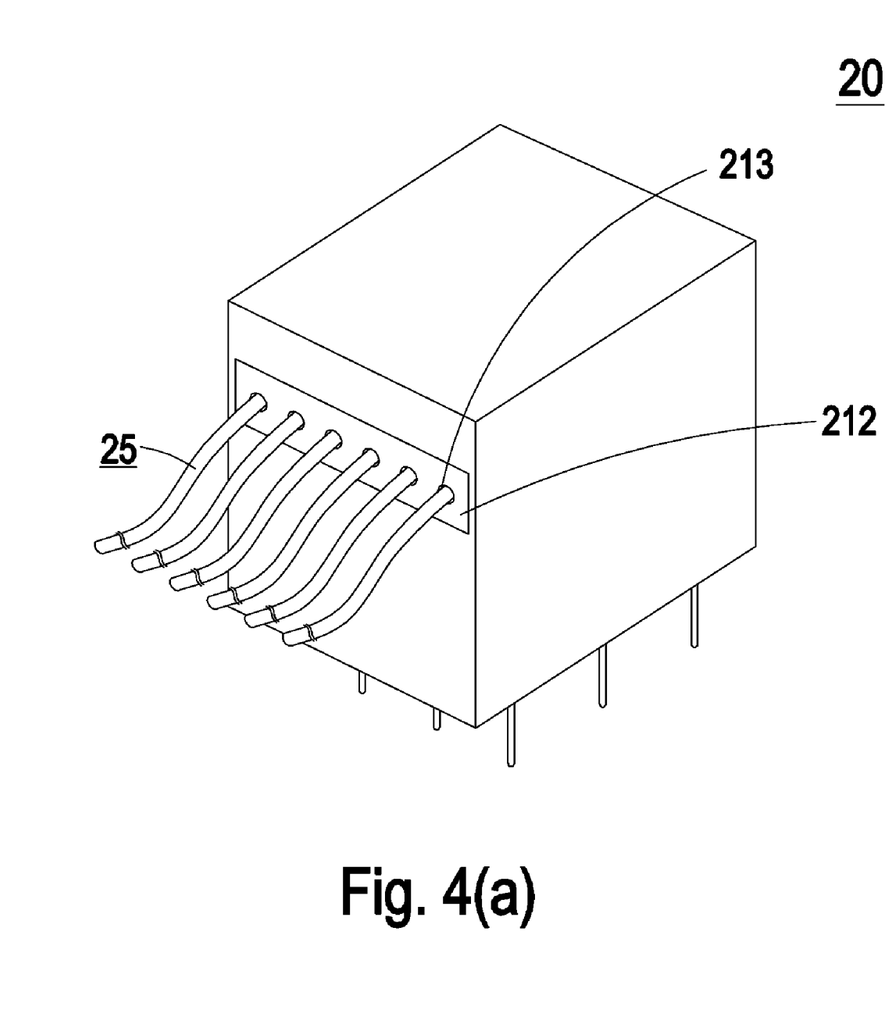
FIG. 4(a) is a schematic backside view of a connector having USB and eSATA interfaces according to a second preferred embodiment of the present invention.
Figure 4B:
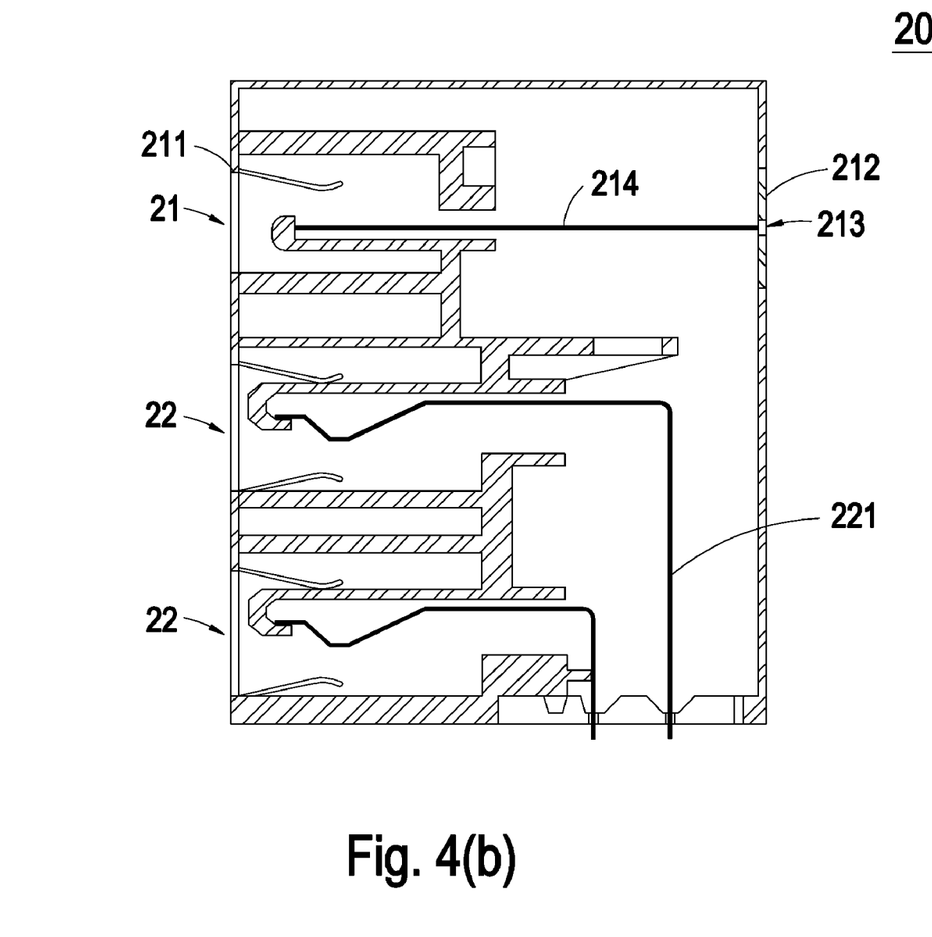
FIG. 4(b) is a schematic cross-sectional view of the connector in FIG. 4(a).

Referring to FIG. 4(a), a schematic backside view of a connector having USB and eSATA interfaces according to a second preferred embodiment of the present invention is illustrated. FIG. 4(b) is a schematic cross-sectional view of the connector in FIG. 4(a). Likewise, the first connecting terminal 211 of the eSATA port 21 is an eSATA socket exposed to outside of the host computer 2. The front view of the connector 20 is identical to that of FIG. 3(a), and is not redundantly described herein. In this embodiment, a first end of the transmission line 25 is welded onto a contact point 213 of the second connecting terminal 212 of the eSATA port 21. A second end of the transmission line 25 has a SATA connector 251 to be plugged into the SATA socket 24 (as shown in FIG. 2). The contact point 213 is electrically connected to the first connecting terminal 211 through a conductive wire 214 (as shown in FIG. 4). That is, signals are transmitted between the external storage device 3 and the motherboard 23 through the first connecting terminal 211, the conductive wire 214, the second connecting terminal 212, the transmission line 25, the SATA connector 251 and the SATA socket 24. In addition, the transmission path to the control chip is reduced and the connector of the present invention may meet the requirement of SATA EMI specification. Since no PCI slot or IO port of the motherboard 23 is occupied by the connector 20 of the present invention, the space utilization of the motherboard of the host computer is enhanced.

From the above description, the connector having USB and eSATA interfaces according to the present invention may be used to connect an external storage device with an electronic device by means of the first connecting terminal and the second connecting terminal of the eSATA port. Since the second connecting terminal of the eSATA port is electrically connected to the motherboard of the electronic device through the transmission line, the SATA connector and the SATA socket, the transmission path to the control chip is reduced. As a consequence, the connector of the present invention may meet the requirement of SATA EMI specification. In addition, since the eSATA port and the USB ports are vertically arranged in a stacking form, the space utilization of the motherboard of the host computer is enhanced because no PCI slot or IO port of the motherboard is occupied by the connector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector having USB and eSATA interfaces used in an electronic device for connecting with an external storage device, said electronic device including a SATA socket on a circuit board, said connector comprising:
at least one USB port; and
an eSATA port stacked with said USB port and including a first connecting terminal and a second connecting terminal, wherein said first connecting terminal is electrically connected to said external storage device, and said second connecting terminal is electrically connected to said SATA socket through a transmission line, so that high-speed data transmission between said external storage device and said circuit board of said electronic device is rendered.

2. The connector according to claim 1 wherein said first connecting terminal of said eSATA port is an eSATA socket exposed to outside of said electronic device.

3. The connector according to claim 1 wherein said electronic device is a host computer, and said circuit board is a motherboard of said host computer.

4. The connector according to claim 1 wherein said first connecting terminal and said second connecting terminal are arranged on opposite sides of said eSATA port.

5. The connector according to claim 1 wherein a first end of said transmission line is welded onto said second connecting terminal of said eSATA port.

6. The connector according to claim 5 wherein a second end of said transmission line has a SATA connector to be plugged into said SATA socket on said circuit board.

7. The connector according to claim 1 wherein said second connecting terminal of said eSATA port is an eSATA socket, and a first end of said transmission line has a SATA connector to be plugged into said second connecting terminal.

8. An electronic device comprising:
a circuit board having a SATA socket mounted thereon; and
at least one connector for connecting with an external storage device, said connector including at least one USB port and an eSATA port stacked with said USB port, wherein said eSATA port includes a first connecting terminal electrically connected to said external storage device and a second connecting terminal electrically connected to said SATA socket through a transmission line, so that high-speed data transmission between said external storage device and said circuit board of said electronic device is rendered.

9. The electronic device according to claim 8 wherein said first connecting terminal of said eSATA port is an eSATA socket exposed to outside of said electronic device.

10. The electronic device according to claim 8 wherein said electronic device is a host computer, and said circuit board is a motherboard of said host computer.

11. The electronic device according to claim 8 wherein said first connecting terminal and said second connecting terminal are arranged on opposite sides of said eSATA port.

* * * * *